May 23, 1933.  E. W. HOLMES  1,910,106
AUTOMOBILE LIFT
Filed Sept. 9, 1930  4 Sheets-Sheet 3
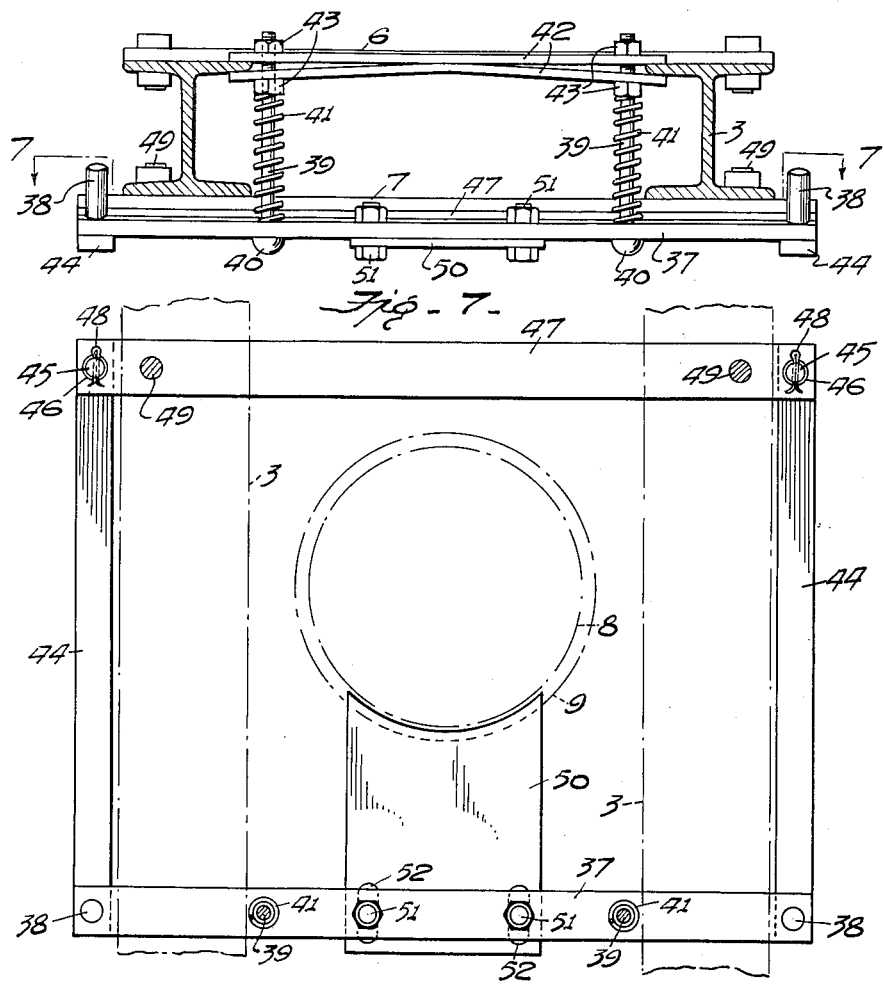
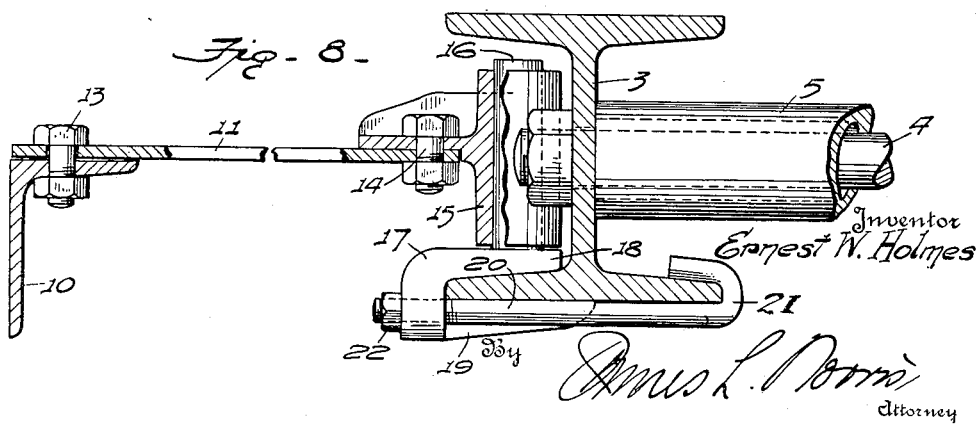
Inventor
Ernest W. Holmes
By
Attorney May 23, 1933.  E. W. HOLMES  1,910,106
AUTOMOBILE LIFT
Filed Sept. 9, 1930   4 Sheets-Sheet 4
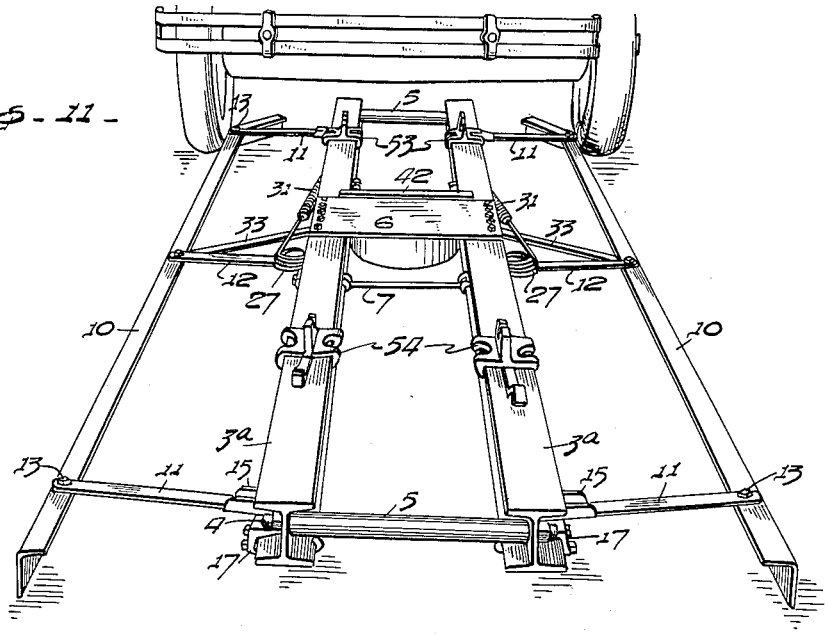
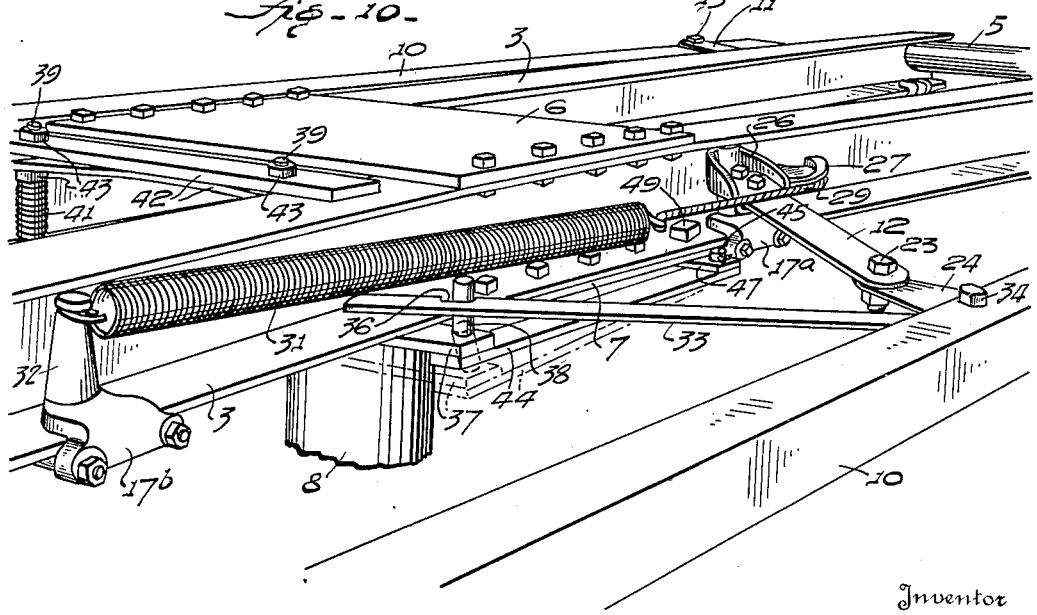
Inventor
Ernest W. Holmes
By James L. Norris
Attorney Patented May 23, 1933

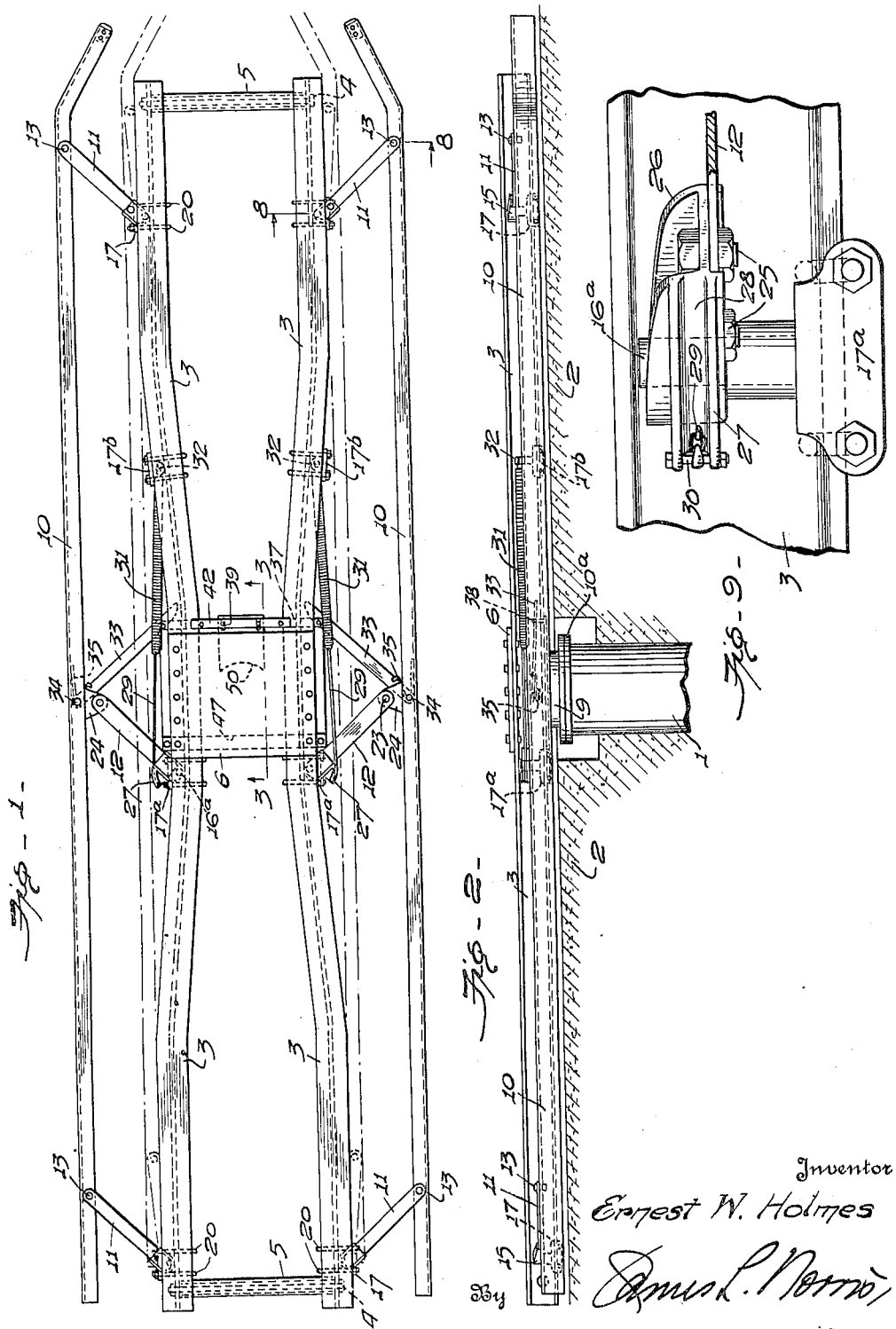

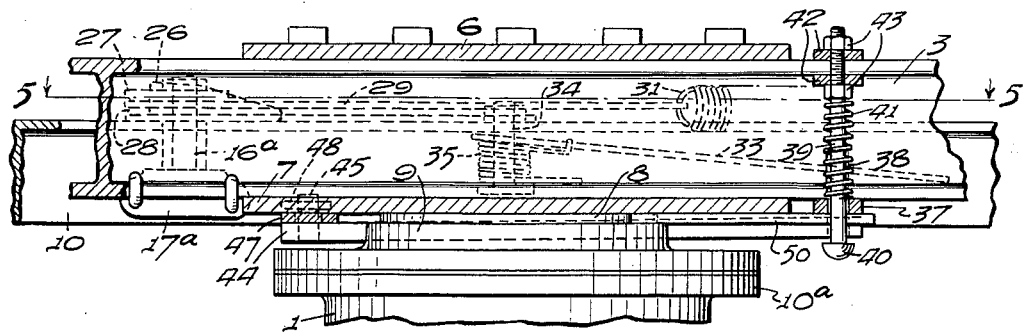
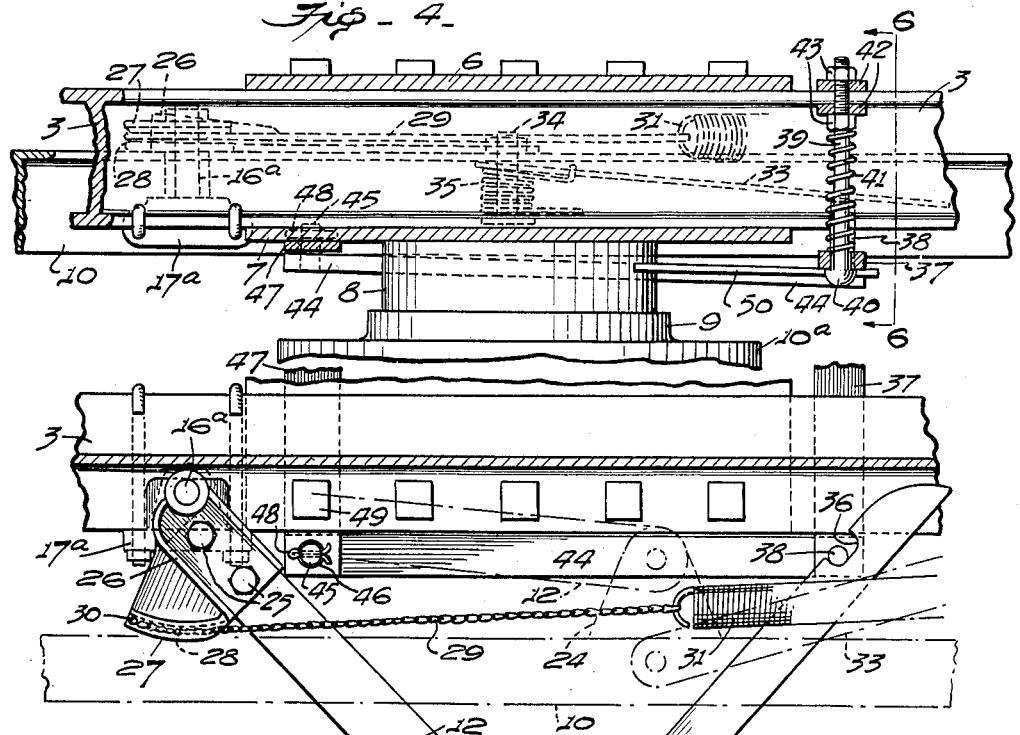
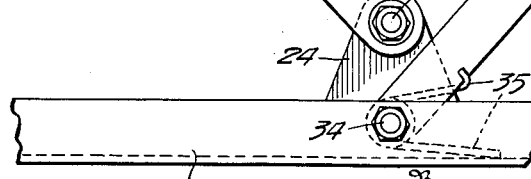

1,910,106

UNITED STATES PATENT OFFICE

ERNEST W. HOLMES, OF CHATTANOOGA, TENNESSEE, ASSIGNOR TO ERNEST HOLMES COMPANY, OF CHATTANOOGA, TENNESSEE, A CORPORATION OF TENNESSEE

AUTOMOBILE LIFT

Application filed September 9, 1930. Serial No. 480,776.

The present invention provides automobile guiding and centering means for automobile lifts of the class embodying a lifting member or frame over which the automobile to be lifted is driven or otherwise placed and which is elevated by lifting mechanism so as to engage beneath the axles of the automobile and elevate the automobile bodily above the ground or floor for inspection, lubrication or other service or for adjustment, repair or other purposes, it being an improvement upon the invention shown and described in my prior application Serial No. 398,461, filed October 9, 1929, now Patent No. 1,800,020, granted April 7, 1931.

One of the primary objects of the invention is to provide guide rails for a lift of this class to cooperate with the wheels of the automobile while the latter is being driven or placed above the lift preparatory to the lifting thereof and thereby insure centering of the automobile transversely of the lift and hence stable positioning of the automobile thereon so as to prevent slipping or lateral tilting or displacement of the automobile while elevated, means being provided for holding the guide rails in relatively extended or operative position while the lift is in its lowermost or automobile receiving position and for tripping such rails automatically when the automobile is lifted and thereby allowing the rails to retract or collapse against the sides of the lifting member or frame, thereby permitting steering movements of the front wheels or the automobile for inspection or adjustment without interference from the rails and affording acessibility to the various parts of the automobile, and also bringing the rails into position where they will clear the automobile wheels and thereby facilitate the driving of the automobile from above the lift when the latter is lowered.

Another object of the invention is to provide a guide rail structure and controlling means of this character which is relatively simple and which may be applied quickly and with facility to automobile lifts of the kinds commonly used or to those already in use.

To these and other ends, the invention consists in certain improvements and combinations and arrangements of parts, all as will be hereinafter more fully described, the features of novelty being pointed out particularly in the claims at the end of this specification.

In the accompanying drawings:—

Fig. 1 is a top plan view showing the guide rails and their controlling means applied to an automobile lift, the guide rails being shown in their extended or operative positions by the full lines and in their retracted or inoperative position by the dotted lines;

Fig. 2 is a side elevation of the lift and the guide rails as shown in Figure 1;

Fig. 3 is a vertical section on an enlarged scale taken longitudinally through the central portion of the lift on the line 3—3 of Fig. 1; the lift being shown in its fully lowered position and the guide rail controlling means in position to hold such rails in their extended or operative positions;

Fig. 4 is a view similar to Fig. 3 but showing the lift partly elevated and the guide rail controlling means in position to trip or release the guide rails so that they may be retracted;

Fig. 5 is a horizontal section taken in the plane of the line 5—5 of Fig. 3, showing one of the guide rails held in its extended position;

Fig. 6 is a transverse vertical section taken on the line 6—6 of Fig. 4, showing in detail the means for holding and tripping the guide rails;

Fig. 7 is a horizontal section through the structure shown in Fig. 6 and taken on the line 7—7 of that figure;

Fig. 8 is a vertical transverse section on an enlarged scale, taken on the line 8—8 of Fig. 1;

Fig. 9 is a detail view in side elevation of a portion of the lifting frame and one of the pivoted rail supporting and operating members;

Fig. 10 is an enlarged perspective view of a portion of the lift and one of the guide rails, showing the means for holding such rail in extended position and for swinging it into retracted position; and Fig. 11 is a perspective view of another form of lift equipped with the guide rails, this view showing the lift as viewed from an end and illustrating the manner in which an automobile is driven or placed above it preparatory to being lifted.

Similar parts are designated by the same reference characters in the several views.

The present invention is applicable generally to automobile lifts of the type having a lifting member or frame adapted to engage beneath the axles of an automobile driven or otherwise placed in position above it for elevating the automobile above the floor or ground, the guide rails, when extended, occupying positions within the width of the space between the wheels at the opposite sides of the automobile and equidistantly at opposite sides of the longitudinal center of the lift so that they will insure the positioning of the automobile above the lift centrally or equidistantly at opposite sides of the longitudinal center thereof, thereby insuring the proper engagement of the lifting member or frame with the under sides of the automobile axles to avoid sliding or displacement of the axles transversely on the lifting member or frame and insuring a proper transverse balance of the automobile thereon and thus avoiding tendency of the automobile to tip or tilt laterally when lifted. The invention affords special advantages when applied to automobile lifts of the turntable type in which the lifting member or frame may rotate about a vertical axis, the guide rails being carried by the rotatable lifting member or frame so that they will always be in position for extension to guide the wheels of an automobile while being placed thereon, irrespective of the angle at which the lift may be, and the retraction of the guide rails, when the lift is lowered, places them in a position where they will not interfere with the driving of the automobile from above the lift irrespective of the angular position into which the lift might be rotated.

The invention in the present instance is shown applied to an automobile lift of the hydraulic turntable type which may be similar to that disclosed in my prior application hereinbefore referred to or may be like those in common use, and since the construction of automobile lifts of this type is well known, it is deemed sufficient to set forth the lift shown as comprising a cylinder 1 which is embedded in vertical position in the ground or a suitable foundation 2, and a lift member or frame composed of longitudinal side members 3 which may be of I-beam or other angle-iron form as shown, these side members being secured together toward their ends by the bolts 4 which connect them and extend through spacing sleeves 5 interposed between the side members, the latter being spaced apart a suitable distance to engage the under sides of the front and rear axles of an automobile in the portions thereof between the steering knuckles and the brake drums respectively, the central portions of the side members being firmly bolted or otherwise secured to top and bottom plates 6 and 7 and the bottom plate 7 being rigidly fixed to the top of a piston or plunger 8 which latter extends through the gland 9 of a stuffing box $10^a$ which is fixed to the upper end of the cylinder 1. Suitable means is commonly used in hydraulic lifts of this type for admitting fluid pressure to the cylinder to act upon the piston 8 to force the latter upwardly and thereby raise the lifting member or frame and for releasing such pressure to permit lowering of said frame, and the piston is round in cross section so that it may rotate about a vertical axis in the cylinder, thereby permitting the lifting member or frame on the piston to be rotated into any desired position about a vertical axis, although the piston will maintain the lifting member or frame in a level position. When the lift is lowered, the lifting member or frame will descend to a position close to or immediately above the ground or floor level as shown in Fig. 2 so that the lifting member or frame will permit an automobile to be driven or otherwise placed in position above it so that the automobile axles are above the lifting member or frame, and when the piston is forced upwardly in the cylinder, the lifting member or frame rises, engaging the under sides of the automobile axle and when lifting the automobile bodily above the ground or floor, and when the lift is lowered or brought to the position shown in Fig. 2, the lifting member or frame descends so as to clear the automobile axles, the automobile wheels then resting on the floor or ground, and the automobile may then be driven or otherwise removed from position above the lift.

The present invention provides guide rails 10 which extend in parallelism or substantially so, at opposite sides of the lifting member or frame, and these guide rails are connected to the lifting member so that they may be extended therefrom transversely into the positions shown by the full lines in Fig. 1 and they may be retracted or collapsed against the respective sides of the lifting member as shown by the dotted lines in that figure. Preferably and as shown in the present instance, the guide rails are pivotally connected to the lifting member or frame of the lift so that they may swing horizontally into either of the positions described by links 11 arranged at or near their ends and the links 12 which pivotally connect the middle portions of the guide rails to the lifting member or frame of the lift. The links 11, which may be of duplicate construction, are each pivotally connected to the respective guide rail 10 to swing horizontally with respect thereto, by a pivot bolt 13, and the other end of each of these links is fixed by a bolt 14 or other suitable means to a member 15 which is supported and rotatably mounted on a vertical pivot pin 16, and in order to secure this pivot pin to the side member 3 of a lift of the type commonly used or to one already in use, this pivot pin is fixed to a clamp 17 having jaws 18 and 19 which are adapted to straddle the outer flange of the angle iron composing the side member 3 of the lift and bolts 20 pass through the clamp 17 and beneath the angular iron member 3 and having hook-shaped ends 21 thereon to straddle the inturned flange of such angle iron side member, tightening of the bolts by the nuts 22 thereon locking the brackets 17 and the pivot pins 16 carried thereby firmly and in the proper positions on the side rails of the lifting frame.

The intermediate links 12 are pivotally connected by the pivot bolts 23 to brackets 24 which extend inwardly from the respective guide rails and the inner ends of these links are fixed by bolts 25 or other suitable means to members 26 which are pivotally supported to swing horizontally on pivot pins 16ᵃ which are carried by brackets 17ᵃ which are constructed and bolted to the side members 3 of the lifting frame in the manner described respecting the bracket 17. Each of the members 26 to which the links 12 are fixed is provided with a segmental portion 27 having a groove 28 therein to receive one end of a chain or other flexible member 29, one end of each of these flexible members being attached to the respective segments 27 by a bolt 30 or suitable fastening means and the other ends of the chains 29 being attached to coiled tension springs 31 the opposite ends of which are connected to pins 32 which are carried by brackets 17ᵇ which may be constructed and bolted to the respective side members 3 of the lifting frame in the manner described respecting the brackets 17. The chains 29 are under the tension of the springs 31, and the resulting tension on these chains causes them to act on the respective segments 27 to swing the links 12 in a direction to retract the guide rails against the respective sides of the lifting frame. The links 11 and 12 are all of equal length so that they form parallel-motion connections between the guide rails and the respective side members of the lifting frame, the inwardly extending brackets 24 being provided for the intermediate links 12 to compensate for the inward offsetting of the side members 3 of the lifting frame as shown in Fig. 1.

The links 11 and 12 pivotally support the guide rails 10 from the opposite sides of the lifting frame, and when the latter is in its fully lowered position it and the guide rails are close to or immediately above the ground or floor level as shown in Fig. 2, and in order to avoid damage to the lift in the event the wheel of an automobile rides up on to the top of either of the guide rails, the links 11 and 12 are constructed of relatively thin resilient material so that they will be flexible vertically, they permiting deflection of the guide rails downwardly into engagement with the floor or ground under the weight of the automobile without causing damage to the lift, and when relieved of the weight of an automobile wheel thereon, the guide rails will return to their normal elevated position above the ground level under the resilient action of these links.

While the springs 31 normally act to swing the guide rails into retracted or collapsed positions against the respective sides of the lifting frame, means is provided for holding the guide rails in extended position beyond the respective sides of the lifting frame and in positions to cooperate with the inner sides of the wheels of an automobile, as when the lifting frame is in its fully lowered position ready to receive an automobile preparatory to the lifting thereof. Such holding means for the guide rails comprises a pair of latches 33 which are pivoted at their outer ends to the respective guide rails 10 by the pivot bolts 34 and are provided with springs 35 which act thereon and tend to swing their inner ends inwardly or against the respective side members of the lifting frame, the inner ends of these latches preferably riding against the respective side member 3 of the lifting frame and resting on the upper side of its lower outturned flange, and each of these latches is provided near its inner end with a notch 36.

Means is provided on the lifting frame to cooperate with the notches 36 in the latches and thereby retain the guide rails in relatively extended positions, and such means is preferably operative automatically to trip or release the latches during the initial part of the ascent of the lift. The latch holding and tripping means as shown in the present instance comprises a cross bar 37 which extends transversely beneath the side members 3 of the lifting frame and is provided at its ends and beyond the sides of said frame with upwardly projecting pins 38 which are rigidly fixed thereto, these pins being adapted to engage in the notches 36 in the respective latches. The cross bar 37 carrying the pins 38 is movable vertically relatively to the lifting frame and to a pair of bolts 39 the lower ends of which extend slidably through the cross bar 37 and are provided with heads 40 against which the cross bar may rest to limit its downward movement, and the cross bar 37 is normally forced downwardly by coiled compression springs 41 which encircle the bolts 39 and bear on the upper side of the bar 37. The bolts 39 are attached to the side members 3 of the lifting frame preferably by a pair of clamping bars 42 which engage above and below respectively the inturned flanges on the upper edges of the side members 3 of the lifting frame, the bolts 39 extending through these clamping bars and being threaded to receive nuts 43 which are adjusted to draw the clamping bars 42 together and thereby clamp them at their ends immovably against the inturned flanges of the side members 3. The cross bar 37 is guided in its vertical movements by a pair of longitudinal bars 44 which are fixed to the outer ends of the cross bar 37 and extend at the outer sides of the side members 3 of the lifting frame, these bars 44 having pins 45 fixed thereto and extending upwardly therefrom and loosely engaging in holes 46 formed in the outer ends of a cross bar 47, the pins 45 being held in place by cotter pins 48 which extend through their upper ends and overlie the upper side of the cross bar 47 and the cross bar 47 being immovably fixed to the lifting frame by the bolts 49 which clamp the bottom plate 7 against the side members of the lifting frame so that the cross bar 47 is immovably secured against the under side of the bottom plate 7. The loose fitting of the pins 45 in the holes in the ends of the cross bar 47 permits the cross bar 37 carrying the pins 38 to move vertically without interference. A plate 50 is fixed to the cross bar 37 so that it extends toward the piston 8 and into a position where it will engage the top of the gland 9 of the stuffing box on the cylinder 1 when the lift reaches its lowered position, this plate being preferably secured to the cross bar 37 by bolts 51 which extend through slots 52 in the plate 50 thus providing for the attachment of the plate 50 to lifts having pistons of different diameters.

When the lift is in its fully lowered position, the plate 50 will rest on the top of the gland 9 of the stuffing box on the cylinder 1 and the cross bar 37 will then be held in its upper position against the action of the springs 41 as shown in Fig. 3, and the pins 38 on the cross bar 37 will then be in the paths of the respective latches 33, and when the guide rails 10 are swung outwardly by the hand or the foot of the attendant, the latches will ride on the pins 38 until the notches 36 reach the pins whereupon these notches will receive such pins, and the latches will then hold the guide rails in their relatively extended position against the action of the springs 31, and the guide rails will then be in positions to cooperate with the inner sides of the wheels of an automobile as the same is driven or brought into position above the lift and they will thus center the automobile in a direction transversely above the lift. After the automobile has been brought into position above the lift, the lift is elevated to raise the automobile, and as the lift rises from its lowermost position, the lifting frame will rise while the plate 50 remains in contact with the stuffing box gland 9 under the action of the springs 41 until the heads 40 on the bolts 39 come against the under side of the cross bar 37 and cause it to rise with the lifting frame, but the delayed ascent of the plate 50 and the cross bar 37 to which it is attached will cause the lifting frame and the latches 33 supported thereon to rise relatively to the pins 38 on the ends of the cross bar 37, thereby carrying the latches upwardly out of engagement with the pins 38 and thereby tripping the latches, and the springs 31 will then act to swing the guide rails into retracted or collapsed positions against the respective sides of the lifting frame.

In Figure 11, the guide rails are shown applied to an automobile lift which is substantially the same as that shown in the preceding figures with the exception that the longitudinal rails, designated 3ª in this figure, are straight or parallel throughout their lengths and saddles 53 and 54 are mounted and guided to slide longitudinally on the upper oppositely directed flanges of the side members 3ª to receive the front and rear axles respectively of the automobile. The guide rails and their cooperating mechanism or structure are the same as in the preceding figures with the exception that the brackets 24 for the intermediate links 12 are omitted, these being unnecessary in this form of lift since the inner and outer pivots of the links 11 and 12 at each side of the lift may be located respectively in alinement, there being no offset in the middle of the lifting frame.

The operation of an automobile lift equipped with guide rails constructed as hereinbefore described is as follows:—

When the lift is in its normal lowered position, the lifting frame and the guide rails at opposite sides thereof will occupy positions slightly above the surface of the ground or floor beneath the lift, as shown in Fig. 2, so that the lifting frame and the guide rails may be swung into any desired angular position about the vertical center of the piston 8 as an axis to bring the lifting frame and guide rails into position to receive the automobile to be lifted. When an automobile is to be lifted, the guide rails 10 are swung outwardly from the dotted line position shown in Fig. 1 to the full line position shown in that figure, by exerting outward pressure by the foot or hand of the attendant, the springs 31 being relatively long so that the guide rails may be swung outwardly by exerting a relatively small force thereon. Since the links 11 and 12 which connect each guide rail with the lifting frame form a parallel-motion connection between these parts, the guide rails will move outwardly while maintaining parallelism between them. Since the plate 50 rests on the top of the stuffing box gland 9 when the lifting frame is in its fully lowered position, as shown in Fig. 3, the pins 38 will be held in their upper positions relatively to the lifting frame, in opposition to the action of the springs 41, so that when each guide rail 10 is swung outwardly, its respective latch 33 will ride against the respective pin 38, under the pressure of the spring 35, until the notch 36 in the latch reaches the respective pin 38, whereupon the pin 38 will become engaged in the notch, as shown in Fig. 5 and said pin will thereby hold the respective guide rail in its relatively extended position against the action of the respective tension spring 31, it being understood that the guide rails at both sides of the lifting frame are intended to be extended before the automobile is placed in position above the lift, and that the guide rails will extend to the same distance from each side of the lifting frame.

While the lift is in its lowermost position and after the guide rails have been extended in the manner just described, the automobile is brought into position above the lifting frame, this being usually accomplished by driving the automobile under its own power, the wheels at the opposite sides of the automobile being made to straddle the lift, and since the distance between the guide rails 10 when fully extended is slightly less than the distance between the inner sides of the wheels or the tires thereon at opposite sides of the standard automobile, the guide rails will be in positions to cooperate with the inner sides of the automobile wheels as the latter is driven into a position above the lift, the guide rails at one end of the lift, as at the right hand end thereof in Fig. 1 being preferably bent inwardly as shown so that they will provide convergent surfaces to engage one or another of the automobile wheels in the event the automobile is not exactly in line with the lift and will thereby rotate the lift about its vertical axis to bring it into line with the automobile. The equidistant spacing of the guide rails at opposite sides of the longitudinal center of the lift will thus insure transverse centering of the automobile above the lift.

When the lift is elevated, as by admitting fluid pressure to the cylinder 1, the lifting frame rises, and during the initial part of the ascent of the lifting frame, the plate 50 continues to rest on the top of the stuffing box gland 9 while the lifting frame and the guide rails and its controlling means, including the latches 33 rise, and in consequence of the relative vertical movement between the lifting frame and the plate 50 which latter is attached to the cross bar 37 which carries the locking pins 38, the latches 33 are carried upwardly above the upper ends of the pins 38, thereby tripping the latches and allowing the springs 31, acting through the chains 29 and segments 27 to swing the guide rails from the extended positions shown in full lines in Fig. 1 into the retracted positions shown by the dotted lines in that figure, the guide rails being then collapsed against the respective sides of the lifting frame. As the lifting frame continues to rise, the heads 40 on the lower ends of the bolts 39 will come into engagement with the under side of the cross bar 37 and will cause the latter to then rise in unison with the lifting frame, and as the ascent of the lifting frame continues, it comes into engagement with the under sides of the front and rear axles of the automobile above it and then lifts the automobile bodily so that its wheels clear the floor or ground, and the automobile may be lifted to any desired height to facilitate inspection, lubrication, adjustment or repair thereof. Since the guide rails collapse against the respective sides of the lifting frame immediately after the upward movement of the lift commences, these guide rails will occupy positions inwardly of the automobile wheels and against the sides of the lifting frame so as to avoid obstructing access to the various parts of the automobile, and the guide rails will not interfere with steering movements of the steering wheels of the automobile so that inspection and adjustment of the steering mechanism may be made with facility.

When the lift is lowered, the guide rails remain in their retracted or collapsed positions, they being held in such positions by the springs 31, although during the final descent of the lifting frame, the plate 50 will come to rest on the top of the stuffing box gland 9 while the lifting frame completes its final descent, thus again bringing the pins 38 into the path of the latches 33, and the retracted positions of the guide rails facilitates driving of the automobile from above the lowered lift since they will clear the automobile wheels and allow the automobile to be steered or turned while being driven from above the lift. While the lift is in its fully lowered position, the pins 38, as stated, are in the path of the latches 33 and in readiness to cooperate with the latches 33 to hold the guide rails in relatively extended positions when swung into such positions preparatory to the placing of another automobile above the lift.

The guide rails and their mounting and operating means as hereinbefore described may be readily and inexpensively applied to automobile lifts of the kinds commonly used or to automobile lifts already in use, since the brackets 17 and 17ª which carry the inner pivots for the links 11 and 12 and the bolts for such brackets may be readily applied to the lower oppositely extending flanges usually provided on the side rails of the lifting frame and adjusted longitudinally thereon to insure the proper simultaneous swinging movements of these links, and the brackets 17ᵇ to which the springs 31 are anchored, together with the clamping bolts therefor which similarly fit the lower oppositely turned flanges of the side members of the lifting frame may be readily adjusted longitudinally on the respective side members of the lifting frame and clamped or secured in positions to insure the proper tension of the springs 31. The clamping bars 42 which carry the bolts 39 which cooperate with the cross bar 37 carrying the pins 38 may be readily clamped against the upper inturned flanges of the side members of the lifting frame, and the cross bar 47 which cooperates with the cross bar 37 may be fixed to the lifting frame by the bolts 49 used to secure the bottom plate 7 to the under side of the lifting frame, the construction just described enabling the guide rails and their cooperating structure to be applied to lifts without the necessity of drilling holes in the lift or otherwise altering its construction.

The holding and tripping of the automobile wheel guide rails by latch means substantially as hereinbefore described enables relatively simple mechanical means to be employed to perform these functions, and since the operation of such means is controlled by the rising or descending movement of the lift, such latch means and its controlling means may be readily and inexpensively applied to automobile lifts of the various types now in use or to lifts already in use.

I claim as my invention:—

1. In an automobile lift comprising a lifting member and means for elevating it to lift an automobile, guide members mounted to move outwardly from opposite sides of said lifting member to cooperate with the wheels of an automobile to center the latter transversely with respect to said lifting member, means tending to move the guide members inwardly toward the sides of the lifting member, means for holding the guide members in their outer positions, and means for releasing said holding means.

2. In an automobile lift comprising a lifting member and means for elevating it to lift an automobile, guide members mounted to move outwardly from opposite sides of said lifting member to cooperate with the wheels of an automobile to center the latter transversely with respect to said lifting member, means tending to move the guide members inwardly toward the sides of the lifting member, means for holding the guide members in their outer positions, and means controlled by the elevating movement of the lifting member for releasing said holding means.

3. In an automobile lift comprising a hydraulic cylinder and a piston movable vertically therein and carrying an automobile lifting frame, automobile wheel guide rails mounted to move into extended or retracted relations with the respective sides of the lifting frame, means acting yieldingly to retract said rails, and means for holding said rails in extended relation, said holding means having a part engageable with a part of said cylinder while the lifting frame is lowered to maintain said holding means in operative position and disengaging from the cylinder and tripping said holding means when the lifting frame is elevated.

4. In an automobile lift comprising a lifting member and means for elevating it to lift an automobile, guide members mounted to move into extended and retracted relations with said lifting member and to cooperate, when extended, with the wheels of an automobile to center the latter transversely with respect to said lifting member, means acting to retract said guide members, latch means for holding the guide members in extended relation, and means controlled by the elevating movement of the lifting member for tripping said latch means.

5. In an automobile lift comprising a lifting member and means for elevating it to lift an automobile, automobile wheel guide members mounted on said lifting member to move into extended and retracted relations therewith, means acting to retract said guide members, latch means for holding the guide members in extended relation, and means cooperative with the latch means while the lifting member is in lowered position to hold the guide members in extended relation and for tripping the latch means when the lifting member is elevated to cause retraction of said guide members.

6. In an automobile lift comprising a lifting member, a support, and means for elevating the lifting member therefrom, automobile wheel guide rails mounted on said lifting member to move into extended and retracted relations therewith, means acting to yieldingly retract said guide rails, latch means for holding the guide members in extended relation, and a part carried by the lifting member and arranged to engage said support while the lifting member is in lowered position to hold said latch means in operative position, said part being relatively movable with respect to the lifting member during elevating movement of the latter and operative to release the latch means.

7. In an automobile lift comprising a lifting member, a support, and means for elevating the lifting member therefrom, automobile wheel guide rails mounted on said lifting member to move into extended and retracted relations therewith, means acting to retract said guide rails, latches for holding said rails in extended relation, an element carried by and movable vertically relatively to the lifting member and having projections to cooperate with the latches, and a part connected to said element and engageable with said support, while the lifting member is lowered, to hold said projections in positions to cooperate with the latches and causing disengagement of said projections from said latches when the lifting member is elevated.

8. In an automobile lift comprising an automobile lifting frame and means for elevating it, automobile wheel guide rails mounted to move into extended and retracted relations with said frame, latches connected to said rails for holding them in extended relation, a member having projections thereon to cooperate with said latches, and clamping means for supporting said member on said frame to move in a direction to carry the projections thereon into and out of cooperative relation with the latches.

9. In an automobile lift comprising an automobile lifting frame and means for elevating it, automobile wheel guide rails mounted on said frame to move into extended and retracted relations therewith, latches connected to said rails for holding them in extended relation, a cross bar on said frame having projections thereon to cooperate with said latches, transverse clamping members for supporting said cross bar on said frame to move in a direction to carry the projections thereon into and out of cooperative relation with the latches, a second cross bar secured to the frame, and longitudinal members movably connected to the latter cross bar and secured to the first-mentioned cross bar.

10. In an automobile lift comprising an automobile lifting frame and means for elevating it, automobile wheel guide rails mounted on said frame to move into extended and retracted relations therewith, and means for retracting each rail embodying a segmental member connected to each rail, a flexible member engaging therewith, and a spring tensioning said flexible member.

11. In an automobile lift comprising an automobile lifting frame and means for elevating it, automobile wheel guiding rails having links pivotally connected thereto, and members pivotally connected to said links and having means for clamping them at different longitudinal points on said frame and supporting said rails to swing into extended and retracted relations therewith.

In testimony whereof I have hereunto set my hand.

ERNEST W. HOLMES.